US009569531B2

(12) United States Patent
Cheng et al.

(10) Patent No.: US 9,569,531 B2
(45) Date of Patent: Feb. 14, 2017

(54) SYSTEM AND METHOD FOR MULTI-AGENT EVENT DETECTION AND RECOGNITION

(75) Inventors: Hui Cheng, Bridgewater, NJ (US); Changjiang Yan, Belle Mead, NJ (US); Harpreet Singh Sawhney, West Windsor, NJ (US); Feng Han, Melville, NJ (US)

(73) Assignee: SRI International, Menlo Park, CA (US)

( * ) Notice: Subject to any disclaimer, the term of this patent is extended or adjusted under 35 U.S.C. 154(b) by 1433 days.

(21) Appl. No.: 12/489,667

(22) Filed: Jun. 23, 2009

(65) Prior Publication Data

US 2009/0319560 A1 Dec. 24, 2009

Related U.S. Application Data

(60) Provisional application No. 61/074,775, filed on Jun. 23, 2008.

(51) Int. Cl.
*G06F 17/30* (2006.01)
*G06K 9/00* (2006.01)
*G06K 9/46* (2006.01)
*G06K 9/62* (2006.01)

(52) U.S. Cl.
CPC ..... *G06F 17/30781* (2013.01); *G06K 9/00771* (2013.01); *G06K 9/4642* (2013.01); *G06K 9/6292* (2013.01)

(58) Field of Classification Search
CPC .................... G06F 17/30781; G06K 9/00771; G06K 9/4642; G06K 9/6292
USPC ........................................................ 707/625
See application file for complete search history.

(56) References Cited

U.S. PATENT DOCUMENTS 6,915,285 B2 * 7/2005 Gray et al. ...................... 706/49
7,574,019 B2 * 8/2009 Mittal et al. .................. 382/103
2007/0179363 A1 * 8/2007 Stupp et al. .................. 600/301
2008/0025647 A1 * 1/2008 Obrador et al. .............. 382/305
2008/0044170 A1 * 2/2008 Yap et al. ....................... 396/52
2008/0069400 A1 * 3/2008 Zhu et al. ..................... 382/103

OTHER PUBLICATIONS

N. Dalal and B. Triggs, "Histograms of oriented gradients for human detection," In Proc. CVPR, 2005.*
S. Hongeng and R. Nevatia, "Large-scale event detection using semi-hidden Markov models," In Proc. ICCV, 2005.

(Continued)

*Primary Examiner* — Dinku Gebresenbet
(74) *Attorney, Agent, or Firm* — Moser Taboada

(57) ABSTRACT

A method and system for creating a histogram of oriented occurrences (HO2) is disclosed. A plurality of entities in at least one image are detected and tracked. One of the plurality of entities is designated as a reference entity. A local 2-dimensional ground plane coordinate system centered on and oriented with respect to the reference entity is defined. The 2-dimensional ground plane is partitioned into a plurality of non-overlapping bins, the bins forming a histogram, a bin tracking a number of occurrences of an entity class. An occurrence of at least one other entity of the plurality of entities located in the at least one image may be associated with one of the plurality of non-overlapping bins. A number of occurrences of entities of at least one entity class in at least one bin may be into a vector to define an HO2 feature.

25 Claims, 13 Drawing Sheets

START

102 — AT LEAST ONE IMAGE IS RECEIVED

104 — A PLURALITY OF ENTITIES ARE DETECTED AND TRACKED IN THE AT LEAST ONE IMAGE

106 — ONE OF THE PLURALITY OF ENTITIES IS DESIGNATED AS A REFERENCE ENTITY

108 — A LOCAL 2D GROUND PLANE COORDINATE SYSTEM OF THE AT LEAST ONE IMAGE CENTERED ON AND ORIENTED WITH RESPECT TO THE REFERENCE ENTITY IS DEFINED

110 — THE LOCAL 2D GROUND PLANE IS PARTITIONED INTO A PLURALITY OF NON-OVERLAPPING BINS, THE BINS FORMING A HISTOGRAM, A BIN TRACKING A NUMBER OF OCCURRENCES OF AN ENTITY CLASS OF INTEREST

112 — THE OCCURRENCE OF AT LEAST ONE OTHER ENTITY OF THE PLURALITY OF ENTITIES LOCATED IN THE AT LEAST ONE IMAGE IS ASSOCIATED WITH ONE OF THE PLURALITY OF NON-OVERLAPPING BINS

114 — THE NUMBER OF OCCURRENCES OF EACH ENTITY CLASS IS LOADED INTO A VECTOR

END

(56) References Cited

OTHER PUBLICATIONS

G. Medioni, I. Cohen, F. Bremond, S. Hongeng and R. Nevatia, "Event detection and analysis from video streams," PAMI, 23(8), 2001.

A. Hakeem and M. Shah, "Learning, Detection and representation of multi-agent events in videos," Artificial Intelligence, 171:585-605, 2007.

N. Ghanem, D. DeMenthon, D. Doermann and L. Davis, "Representation and recognition of events in surveillance video using Petri Nets," In Proc. Computer Vision and Pattern Recognition Workshop (CVPRW'04), 2004.

A. Hoogs, M.T. Chan, R. Bhotika and J. Schmiederer, "Recognizing complex behaviors in aerial video," In Proc. Int'l Conf. on Intelligence Analysis, McLean, VA, USA, May 2-4, 2005.

S. Belongie, J. Malik and J. Puzicha, "Shape Context: a new descriptor for shape matching and object recognition," In NIPS, 2000.

N. Dalai and B. Triggs, "Histograms of oriented gradients for human detection," In Proc. CVPR, 2005.

D. Lowe, "Distinctive image features from scale-invariant keypoints," Int'l J. of Comput. Vision, 60(2):91-110, 2004.

* cited by examiner

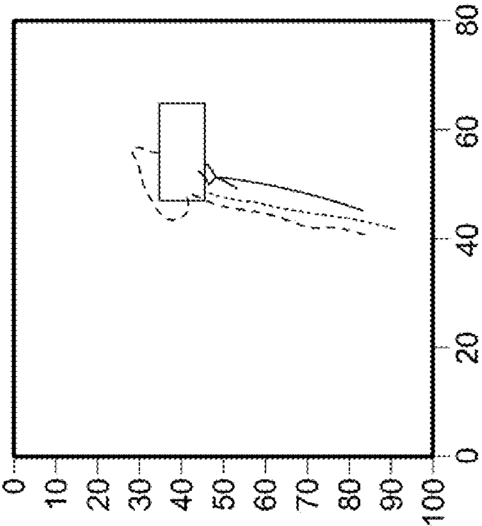
FIG. 15A
FIG. 15B
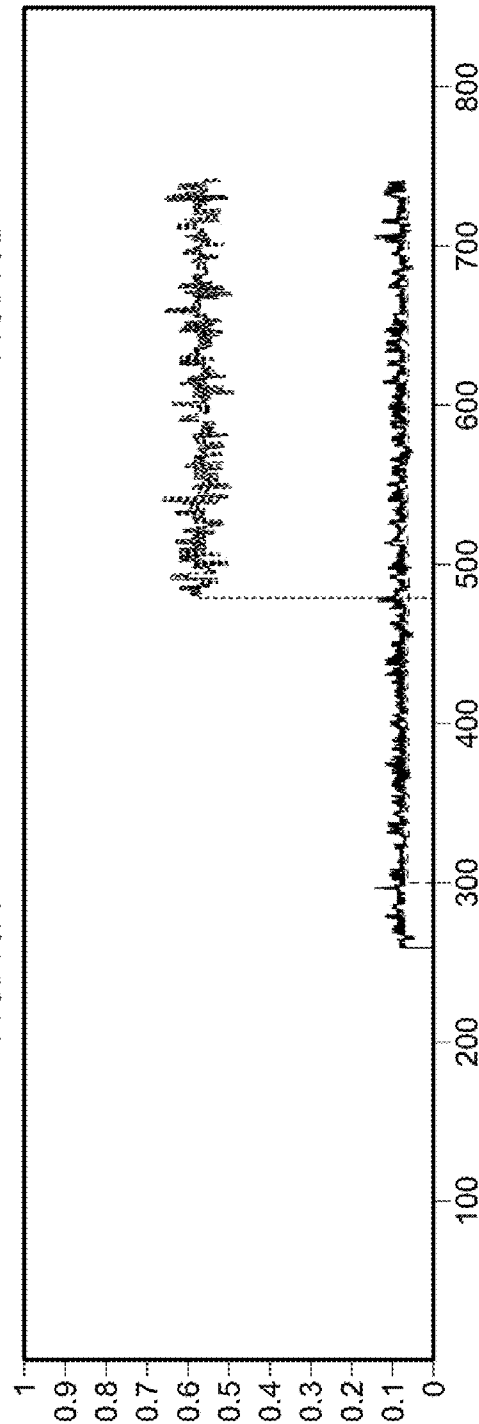
FIG. 15C

SYSTEM AND METHOD FOR MULTI-AGENT EVENT DETECTION AND RECOGNITION

CROSS-REFERENCE TO RELATED APPLICATIONS

This application claims the benefit of U.S. provisional patent application No. 61/074,775 filed Jun. 23, 2008, the disclosure of which is incorporated herein by reference in its entirety.

GOVERNMENT RIGHTS IN THIS INVENTION

This invention was made with U.S. government support under contract number NBCH-C-07-0062. The U.S. government has certain rights in this invention.

FIELD OF THE INVENTION

The invention relates generally to multi-agent event detection and recognition system. More specifically, the invention relates to a system and method for providing a computational framework for automated detection and recognition of events in video images.

BACKGROUND OF THE INVENTION

Automated detection and recognition of events in video is desirable for video surveillance, video search, automated performance evaluation and advanced after-action-review (AAR) for training, and autonomous robotics. A class of events known as "multi-agent" events involves interactions among multiple entities (e.g., people and vehicles) over space and time. Multi-agent events may generally be inferred from the participating object types, object tracks and inter-object relationships observed within the context of the environment. Some simple example of multi-agent events include vehicles traveling as a convoy, people walking together as a group, meetings in a parking lot, etc. Although these simple events demonstrate the concept multi-agent events, it is desirable for a system to recognize more complex multi-agent events. Examples of more complex multi-agent events include the arrival/departure of a VIP with security detail, loading and unloading with guards or in the presence of unrelated people, meetings led by a few individuals, and coordinated team actions such as sports plays and military exercises.

Recent work has addressed modeling, analysis and recognition of complex events. The descriptors used in such approaches include object states, such as start, stop, move or turn, interactions among entities that are typically instantaneous, and pair-wise measures such as relative distance or relative speed between an entity and a reference point or a reference entity. The pair-wise measurements sometimes are quantized into Boolean functions such as Approaches, Meets/Collides, etc.

Unfortunately, such approaches in the prior art rely on a pre-defined ontology of an event and fixed numbers and types of objects that participate in an event. Moreover, although pair-wise measurements are effective for events involving a small number of entities, they are inadequate and inefficient for representing and analyzing complex configurations of multiple entities that interact with each other simultaneously. For example, with the same relative distance and the same relative speed, two people can walk together or one follows the other, which indicates different relationships among the two people.

Accordingly, what would be desirable, but has not yet been provided, is a system and method for effectively and automatically capturing complex interactions amongst multiple entities including context over space and time.

SUMMARY OF THE INVENTION

The above-described problems are addressed and a technical solution achieved in the art by providing a method and system for creating a histogram of oriented occurrences (HO2), the method being executed by at least one processor, comprising the steps of: (a) detecting and tracking a plurality of entities in at least one image; (b) designating one of the plurality of entities as a reference entity; (c) defining a local 2-dimensional ground plane coordinate system centered on and oriented with respect to the reference entity; and (d) partitioning the 2-dimensional ground plane into a plurality of non-overlapping bins, the bins forming a histogram, a bin tracking a number of occurrences of an entity class. According to an embodiment of the present invention, the method may further comprise the step of associating an occurrence of at least one other entity of the plurality of entities located in the at least one image with one of the plurality of non-overlapping bins. Each of the plurality of entities may be one of an object and the location of an object in the at least one image. Steps (a)-(d) may be computed over one of a time instance and a time interval. The partitioned 2-dimensional ground plane may move when the reference entity moves. Step (d) may further comprise the step of employing a parts-based partition, wherein the parts-based partition measures a distance to the reference entity as the shortest distance to a point on the boundary of the reference entity and the bins are defined based on important parts of the reference entity.

According to an embodiment of the present invention, the method may further comprise the step of loading a number of occurrences of entities of at least one entity class in at least one bin into a vector to define an HO2 feature.

According to an embodiment of the present invention, the method may further comprise the steps of: geo-referencing the detected entities and their tracks to the 2-dimensional ground plane, annotating each of the detected entities as one of a positive reference entity and a negative reference entity; computing an HO2 feature for each annotated entity, the annotated entity being used as a reference entity; selecting HO2 features with positive reference entities as positive training samples and selecting HO2 features with negative reference entities as negative training samples; classifying event samples with a classifier using the HO2 features using the positive and negative training samples; extracting a second set of entities from a plurality of images; computing HO2 features of each of the second set of entities, wherein, for each HO2 feature computation, a different one of the second set of entities is chosen as the reference entity; and classifying each of the second set of entities with the classifier to determine whether the event has occurred in the plurality of images. The classifier may be a support vector machine (SVM).

According to an embodiment of the present invention, the method may further comprise the steps of: computing HO2 features for an entity of interest from the plurality of entities over a sliding window of time to form a time sequence and clustering the time sequence using a clustering algorithm. The clustering algorithm may comprise constructing a hierarchical cluster tree using $\chi^2$ distance and a using nearest neighbor strategy. The distance between two clusters is the smallest distance between objects in the two clusters. The clustering algorithm may further comprise constructing clusters recursively from the root to leaves of the hierarchical cluster tree based on one of an inconsistence measure and the maximum number of clusters.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 15 illustrates a screen shot of VIP detection and recognition system.

It is to be understood that the attached drawings are for purposes of illustrating the concepts of the invention and may not be to scale.

DETAILED DESCRIPTION OF THE INVENTION

Figure 1:
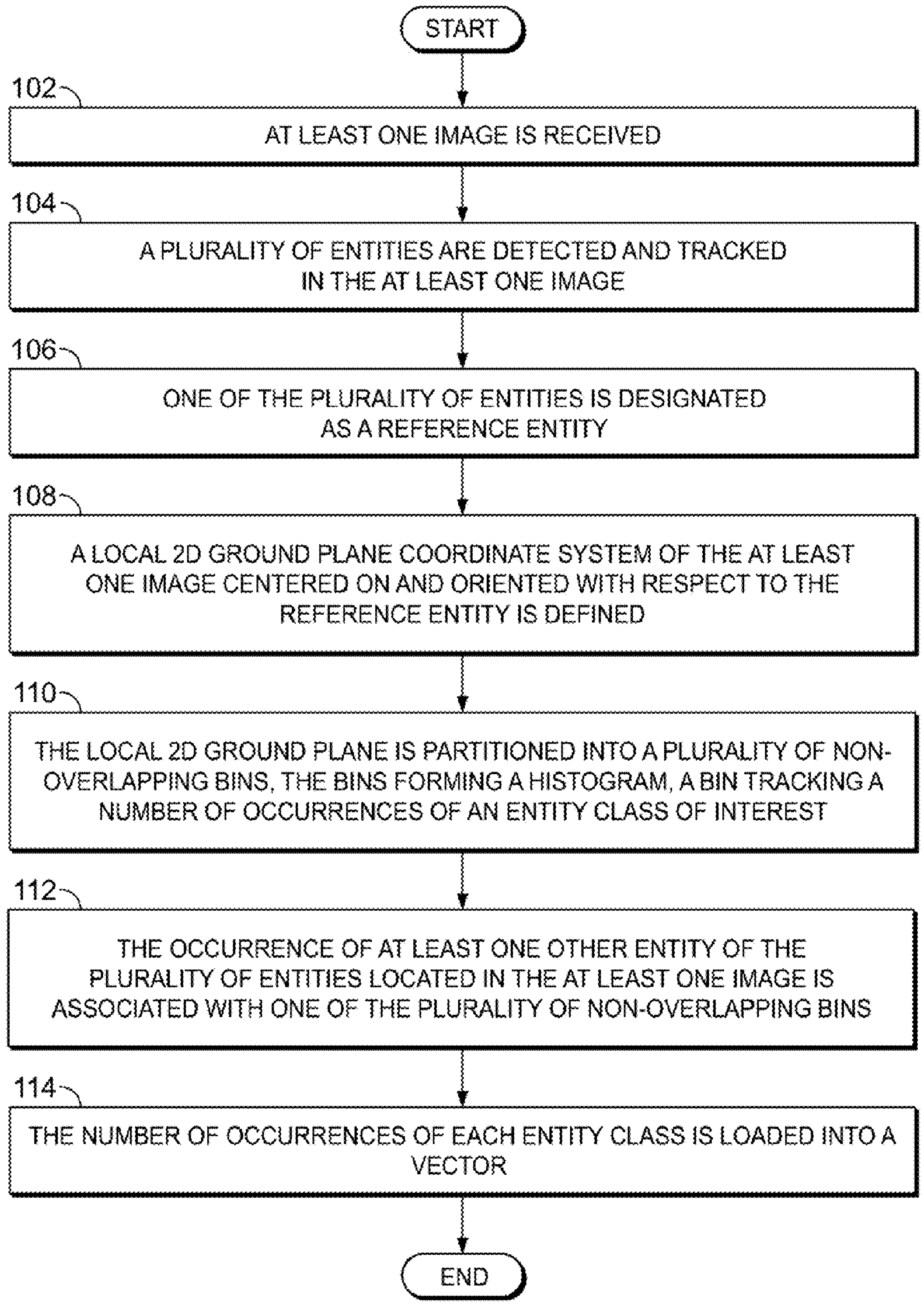
FIG. 1 is a process flow diagram illustrating exemplary steps for creating a histogram of oriented occurrences (HO2), according to an embodiment of the present invention.

FIG. 1 is a process flow diagram illustrating exemplary steps for creating a histogram of oriented occurrences (HO2), according to an embodiment of the present invention. An HO2 aggregates the relative space-time relationships amongst multiple objects that can be used as an intermediate feature to detect and classify complex multi-object events. At step 102, at least one image is received from at least one image capturing device, such as a video/still camera, which may be rigid or moving. At step 104, a plurality of entities are detected and tracked in the at least one image. According to an embodiment of the present invention, each of the plurality of entities may be an object or the location of the object in the at least one image. At step 106, one of the plurality of entities is designated as a reference entity, which itself may be an entity or the location of an entity. According to an embodiment of the present invention, an HO2 captures the presence of entities with respect to a reference entity or a reference location over space and time. At step 108, given a reference entity, a local 2D ground plane coordinate system centered on and oriented with respect to the reference entity is defined. At step 110, step the local 2D ground plane is partitioned into a plurality of non-overlapping bins, the bins forming a histogram, a bin tracking a number of occurrences of an entity class of interest. At step 112, the occurrence of at least one other entity of the plurality of entities located in the at least one image is associated with one of the plurality of non-overlapping bins. As a result, an HO2 is a histogram comprising a number of occurrences of each entity class of interest in each bin. Typical entity classes of interest are people, vehicles, buildings and roads. The HO2 may be computed at a time instance or over a time interval. When computed over a time interval, the HO2 is the accumulated occurrences of entities over the time interval. If the reference entity moves, such as a moving vehicle or person, the partitioning of the ground plane (or the bins) moves with the reference entity. As a result, an HO2 captures entity interactions within the frame of reference of the reference entity. According to an embodiment of the present invention, in step 114, the number of occurrences of each entity class in the HO2 is loaded into a vector, thereby defining an HO2 feature (vector). The entities tracked in each bin may move in various directions over a time interval.

Figure 2A:
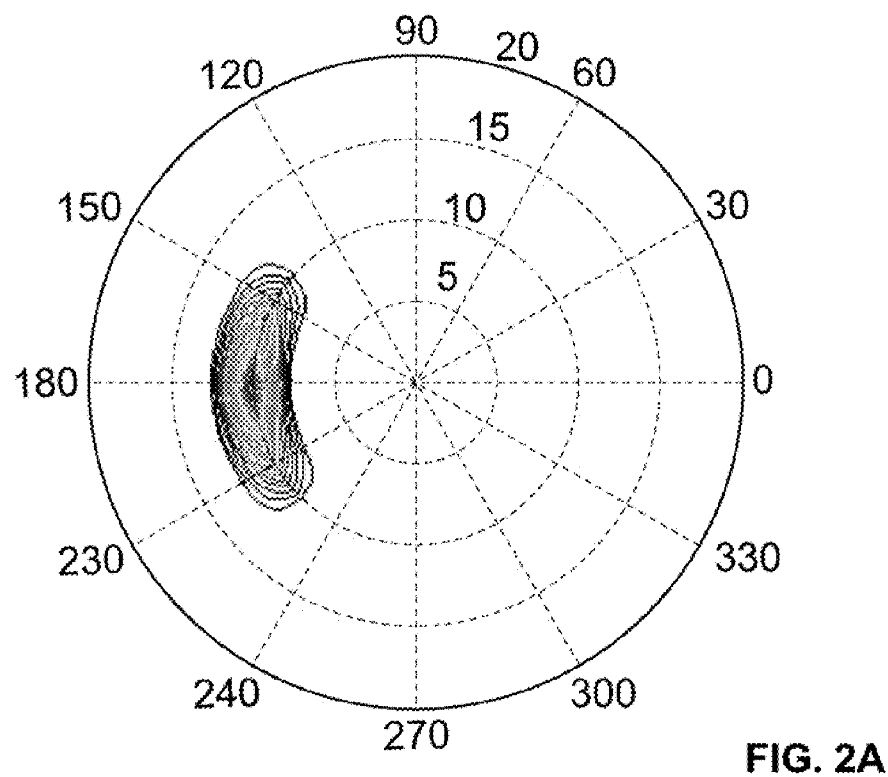
FIG. 2 depicts instances of HO2 features for two simple multi-entity events, specifically of two persons walking in different formations, according to an embodiment of the present invention.
Figure 2B:
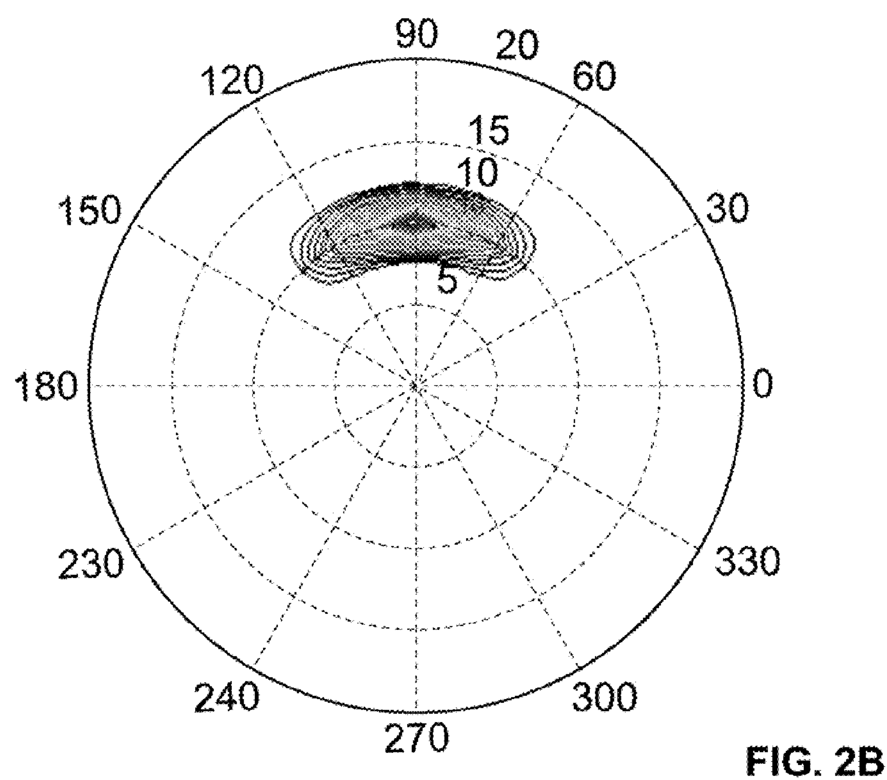

FIG. 2 depicts instances of HO2 features for two simple multi-entity events, specifically of two persons walking in different formations, according to an embodiment of the present invention. FIG. 2*a* illustrates HO2 features (vectors) of two persons walking with one following the other (i.e., in single file) and FIG. 2*b* illustrates HO2 features of two persons walking side by side (i.e., in echelon formation), each of the HO2 features of FIGS. 2*a* and 2*b* generating different spatial patterns. The 0 degree corresponds to the walking direction of the reference person. Therefore, a person walking behind the reference person corresponds to a cluster at 180 degrees in FIG. 2*a* and a person walking to the left of the reference person corresponds to a cluster at 90 degrees in FIG. 2*b*. An HO2 feature is robust to clutter or noise in the real world scenarios. An HO2 feature is invariant to translation. Through normalization with respect to the reference entity, an HO2 feature is also invariant to scaling and rotation. An HO2 feature may be used by standard statistical clustering and classification techniques for complex event detection and recognition.

More formally, in its most generalized form, an HO2 is a histogram of occurrences of entity classes of interest over a partition of a spatial-temporal volume with respect to a reference entity or a reference location. That is, given a partition function, P and a reference entity R, the 2D ground plane $\Omega$ is partitioned into N non-overlapping regions or bins, $\Omega_i(R)$, such that, $P(\Omega, R)=\{\Omega_0(R), \ldots, \Omega_N\}$, where $$\Omega = \bigcup_{i=1}^{N} \Omega_i(R)$$

and $\Omega_i(R) \cap \Omega_j(R) = \emptyset$, if $i \neq j$. Also, given a set of entity classes, $E = \{e_0, \ldots, e_M\}$, the HO2 feature f(I, R, T) for video clip I, reference entity R and time interval T, is an N×M dimensional vector:

$$f(I,R,T) = \{I_{i,j,k};\ i=1, \ldots, N;\ j=1, \ldots, M;\ k=1, \ldots, K\}$$

where $I_{i,j,k}$ is the number of occurrences of entities of class $e_j$ in $\Omega_i(R)$ that is moving toward the direction in the bin k over the time interval T. Note that the bins or the partition of the space is a function of the reference entity R. When R moves, the bins move with it.

An HO2 feature is associated with three properties that can be optimized for different applications depending on the entity: (1) a partition function for defining bins used in histogram calculation; (2) a spatial and temporal support and (3) entity categories on which the histograms are computed.

The partition function of an HO2, $P(\Omega, R)$, defines the bins, $\Omega_i(R)$, used to compute the histogram of entities of interest. In a preferred embodiment, an HO2 preferably uses a log-polar partition, a uniform partition in the log-polar coordinate system, as used in a shape context feature. The log-polar partition is most appropriate when the reference entity can be modeled as an oriented point (a vector), such as when the reference entities are people and vehicles. However, it may not be adequate for large reference entities, such as building or roads.

Figure 3:
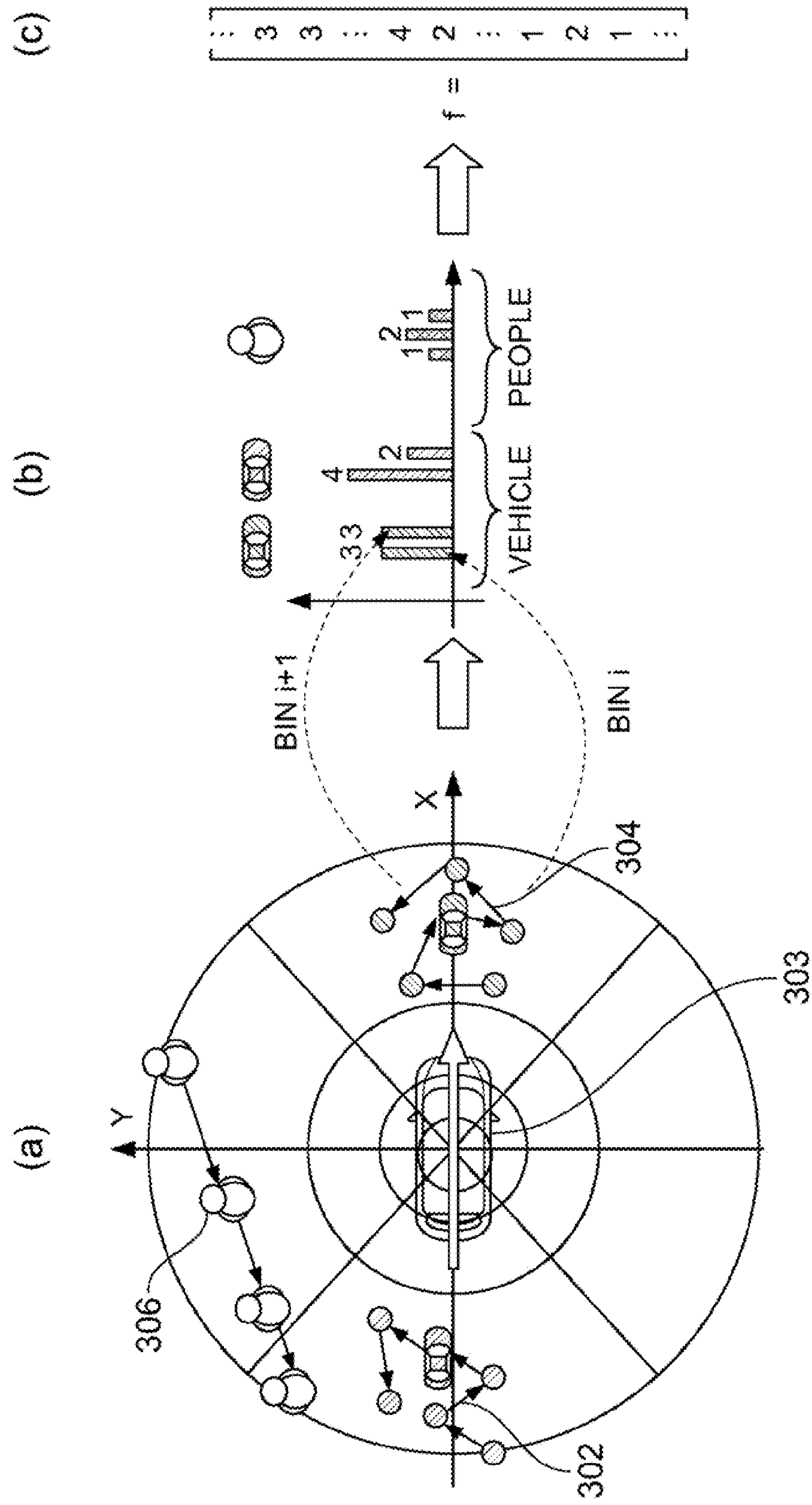
FIG. 3 visually depicts of HO2 features using a log-polar partition function.

An example of depicting HO2 features using log-polar partition function is shown in FIG. 3. The scenario shows a moving convoy, for example, a vehicle 302, a vehicle 304, and a pedestrian 306 crossing the street in FIG. 3A. The reference entity 303 is the middle vehicle in a three-vehicle convoy. The coordinate system used to compute an HO2 is defined by the reference vehicle 303. The X-direction is the direction of the vehicle movement as shown by the car icon at the origin. The vehicles 302, 304 follow in front of and behind the reference vehicle 303, respectively. Thus, two entity classes in this example are vehicle and people. The coordinate system is determined by the reference vehicle 303 shown at the origin. The x-axis corresponds to the heading of the reference vehicle 303. As illustrated in FIG. 3, the histograms of vehicle and people occurrences are shown in FIG. 3B and the resulting HO2 feature vector is shown in FIG. 3C. In this example, quantization according to the direction of movement is not shown.

Figure 4:
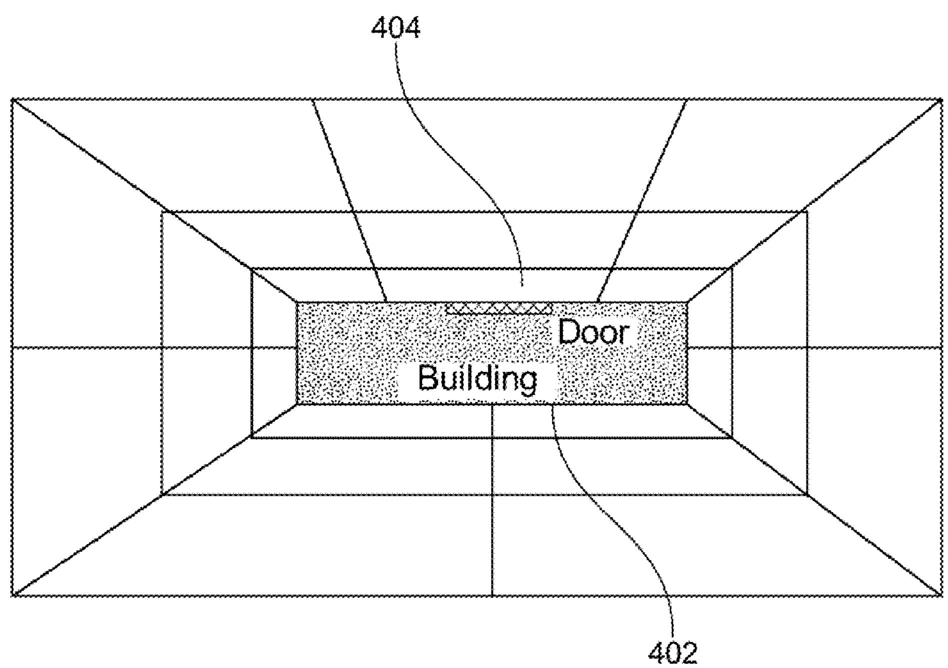
FIG. 4 illustrates an example of part-based partition with respect to a rectangular shaped building with one door.

When parts of the reference entity are important or the reference entity cannot be treated as a point, a parts-based partition may be used. A parts-based partition measures a distance to the reference entity as the shortest distance to a point on the boundary of the reference entity and the bins are defined based on the important parts of the reference entity. Although parts-based partitions are often defined manually, due to the small number of entity categories and the small number of parts for each entity category that are of interest, a parts-based partition function can be defined for each entity category beforehand and used for all events thereafter. FIG. 4 illustrates an example of a part-based partition with respect to a rectangular shaped building 402 with one door 404. A partition function may be specified for an entity class, such as the building 402, where the partition adapts to the entity class and components of the class, such as doors 404.

A second property associated with an HO2 feature, spatial and temporal support, is represented by L and T, respectively. L is the maximal distance to the reference entity/location. Entities located further than L are not counted in an HO2 histogram. T is the duration of a temporal processing window.

A third property associated with an HO2 feature is entity categories that are important for events in surveillance and training applications such as people, vehicles, buildings, rooms and roads. According to an embodiment of the present invention, both vehicles and people may be used as reference entities, however, for simplicity, HO2 calculations may be limited to a people class when all the events in a video clip are people centric.

HO2 features may be used for different aspects of multi-agent event analysis. An HO2 feature may be directly used for event detection through supervised training, which is described hereinbelow with reference to FIG. 5. HO2 features may also be used in an unsupervised mode for temporal segmentation or clustering of entity tracks for event representation and recognition to be described with reference to FIG. 6.

Figure 5:
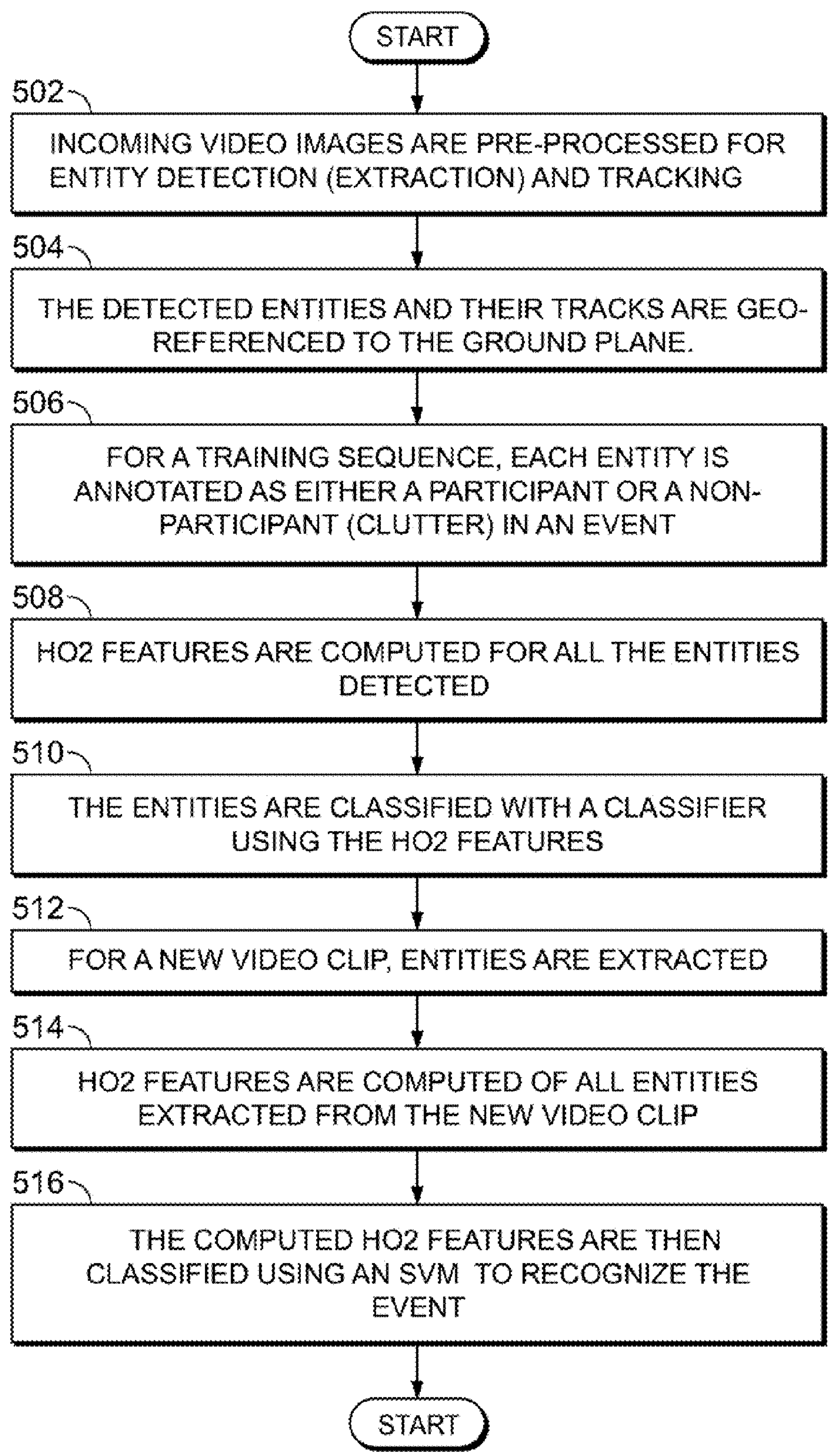
FIG. 5 is a process flow diagram illustrating exemplary steps of a supervised multi-agent event detection method employing HO2 features, according to an embodiment of the present invention.

FIG. 5 is a process flow diagram illustrating exemplary steps 500 of a supervised multi-agent event detection method employing HO2 features, according to an embodiment of the present invention. Incoming video images are initially pre-processed for entity detection and tracking (extraction) at step 502. Pre-processing may be implemented by any of a number of existing methods. According to an embodiment of the present invention, pre-processing may be implemented by classifying the entities extracted from the incoming video images into broad categories such as people, vehicles, buildings and roads. At step 504, the extracted entities and their tracks are geo-referenced to the ground plane. This is achieved either through a manual calibration of the camera system or automated geo-registration using ortho-rectified reference imagery.

To recognize an event, annotated samples of the event are used as a training set. In a training sequence, there are a number of entities. At step 506, each entity is annotated as a correct (positive) reference entity or an incorrect (negative) reference entity (clutter). At step 507, for each annotated entity, an HO2 feature is calculated using the annotated entity as a reference entity. At step 508, the calculated HO2 features with positive entities used as the reference entity are selected as positive training samples and the remainder selected as negative training samples. At step 510, event samples are classified with a classifier using the HO2 features. In one preferred method of classification, a support vector machine (SVM) is built using the above selected positive and negative training samples.

For a new video clip (i.e., a plurality of images), at step 512, entities are extracted. At step 514, HO2 features are computed for all entities extracted from the new video clip, wherein, for each HO2 feature computation, a different one of the entities is chosen as the reference entity. At step 516, the computed HO2 features are then classified using an SVM to recognize the given event (i.e., whether or not the event has occurred in the new video clip).

Figure 6:
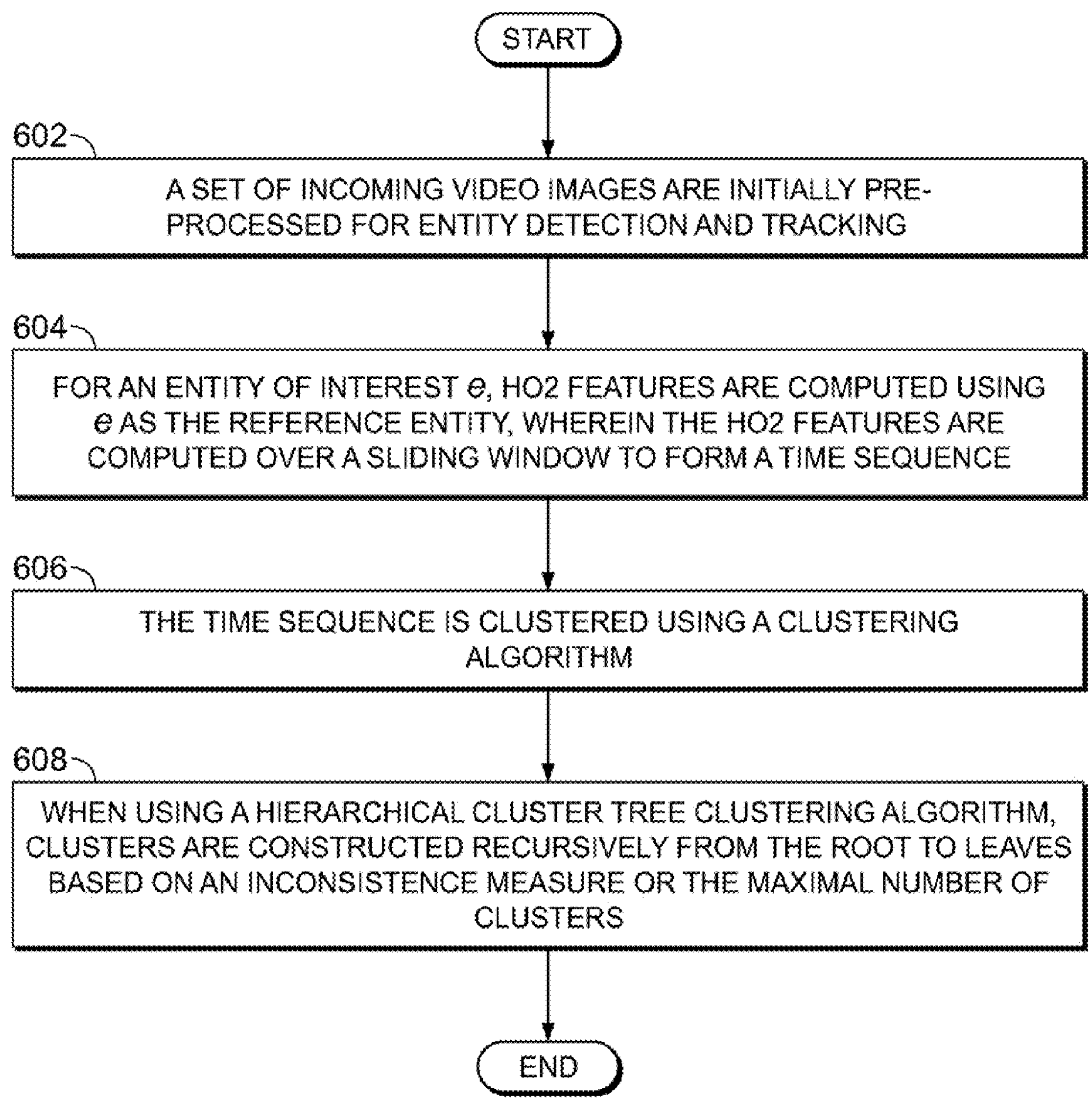
FIG. 6 is a process flow diagram illustrating exemplary steps of an unsupervised multi-agent event detection method employing HO2 features, according to an embodiment of the present invention.

FIG. 6 is a process flow diagram illustrating exemplary steps 600 of an unsupervised multi-agent event detection method employing HO2 features, according to an embodiment of the present invention. In an unsupervised mode, the goal is to use temporal segmentation or clustering to partition a complex event temporally into non-overlapping time intervals. Each of the intervals comprises a single sub-event. Thus, in step 602, a set of incoming video images is initially pre-processed for entity detection and tracking. For an entity of interest e, such as a person, a vehicle, or a building, HO2 features are computed at step 604 using e as the reference entity. The aforementioned HO2 features are computed over a sliding window [t−Δt, t+Δt] to form a time sequence f(I,e,[t−Δt, t+Δt]). The time sequence f(I,e,[t−Δt, t+Δt]) may be clustered at step 606 using any clustering algorithm. According to an embodiment of the present invention, a hierarchical cluster tree may be constructed as the clustering algorithm using $\chi^2$ distance and a nearest neighbor strategy. Using this approach, the distance between two clusters is the smallest distance between objects in the two clusters. For cluster r size of n, and cluster s size of $n_s$, the nearest neighbor distance $d_{NN}(r,s)$ between r and s is: $d_{NN}(r,s)=\min(\mathrm{dist}(x_{r_i}, x_{s_j})), i\in(1, \ldots, n_r), j\in(1, \ldots, n_s)$.

Once the hierarchical cluster tree is built, at step 608, clusters are constructed recursively from the root to leaves based on an inconsistence measure or the maximum number of clusters.

Figure 7:
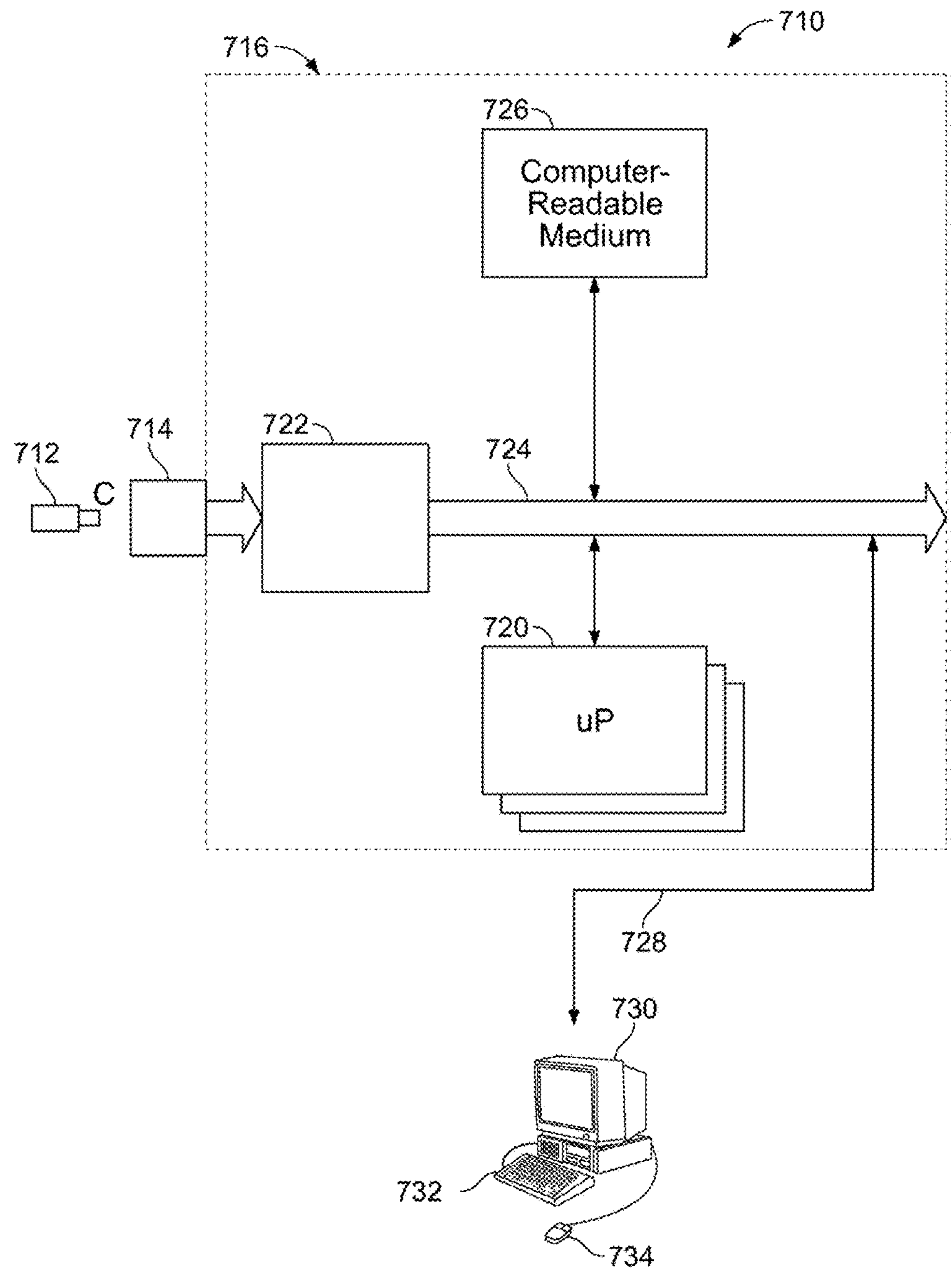
FIG. 7 depicts a system for creating a histogram of oriented occurrences (HO2), according to an embodiment of the present invention.

FIG. 7 depicts a system for creating a histogram of oriented occurrences (HO2), according to an embodiment of the present invention. By way of a non-limiting example, the system 710 receives digitized video or still images from one or more image capturing devices 712, such as one or more still or video cameras. The system 710 may also include a digital video capture system 714 and a computing platform 716. The digital video capturing system 714 processes streams of digital video, or converts analog video to digital video, to a form which can be processed by the computing platform 716. The digital video capturing system 714 may be stand-alone hardware, or cards such as Firewire cards which can plug-in directly to the computing platform 716. According to an embodiment of the present invention, the image capturing devices 712 may interface with the video capturing system 714/computing platform 716 over a heterogeneous datalink, such as a radio link (e.g, between an aircraft and a ground station) and digital data link (e.g, ethernet, between the ground station and the computing platform 716). The computing platform 716 may include a personal computer or work-station (e.g., a Pentium-M 1.8 GHz PC-104 or higher) comprising one or more processors 720 which includes a bus system 722 which is fed by video data streams 724 via the one or more processors 720 or directly to a computer-readable medium 726. The computer readable medium 726 may also be used for storing the instructions of the system 710 to be executed by the one or more processors 720, including an operating system, such as the Windows or the Linux operating system. The computer readable medium 726 may further be used for the storing and retrieval of video clips of the present invention in one or more databases. The computer readable medium 726 may include a combination of volatile memory, such as RAM memory, and non-volatile memory, such as flash memory, optical disk(s), and/or hard disk(s). Portions of a processed video data stream 728 may be stored temporarily in the computer readable medium 726 for later output to a monitor 730. The monitor 730 may display processed video data stream/still images. The monitor 730 may be equipped with a keyboard 732 and a mouse 734 for selecting objects of interest by an analyst.

Testing scenarios employing HO2 features are described hereinbelow. Two testing sets are used in the testing scenarios. A first set is Ground surveillance data set. This data set contains videos collected in a parking lot with staged events and normal background activities. The resolution of the data set is approximately 3-4 cm/pixel. There are 47 video sequences and 143 noise-free people tracks in the data set. For the first set, 5% Gaussian white noise is added.

A second set is training exercise data set. This data set contains video collected during room clearing training exercises using cameras installed on ceilings. The resolution is approximately 3 cm/pixel. The video is captured for trainee performance evaluation and after-action-review. The tracks are generated using radio frequency identification (RFID) based triangulation. There are significant errors in the tracks due to multi-path interference.

Figure 8A:
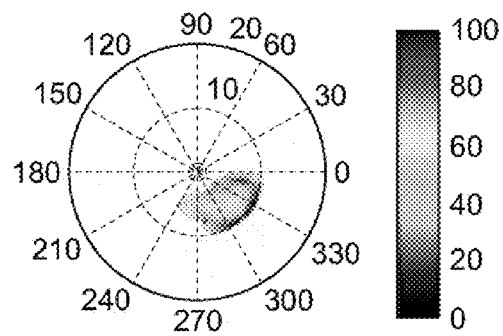
FIG. 8 illustrates three action stages in an Unload3P clip and corresponding HO2 features.
Figure 8B:
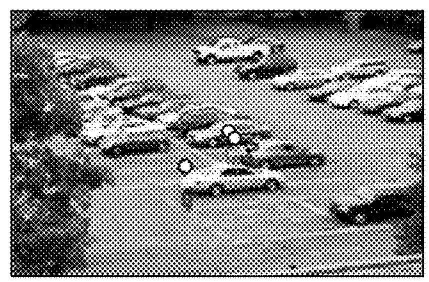
Figure 8B:
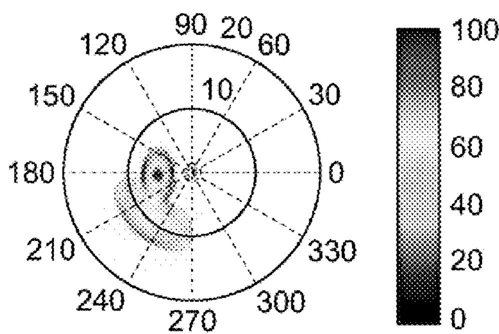
Figure 8C:
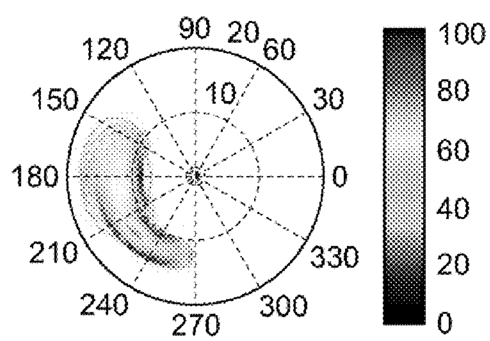
Figure 9:
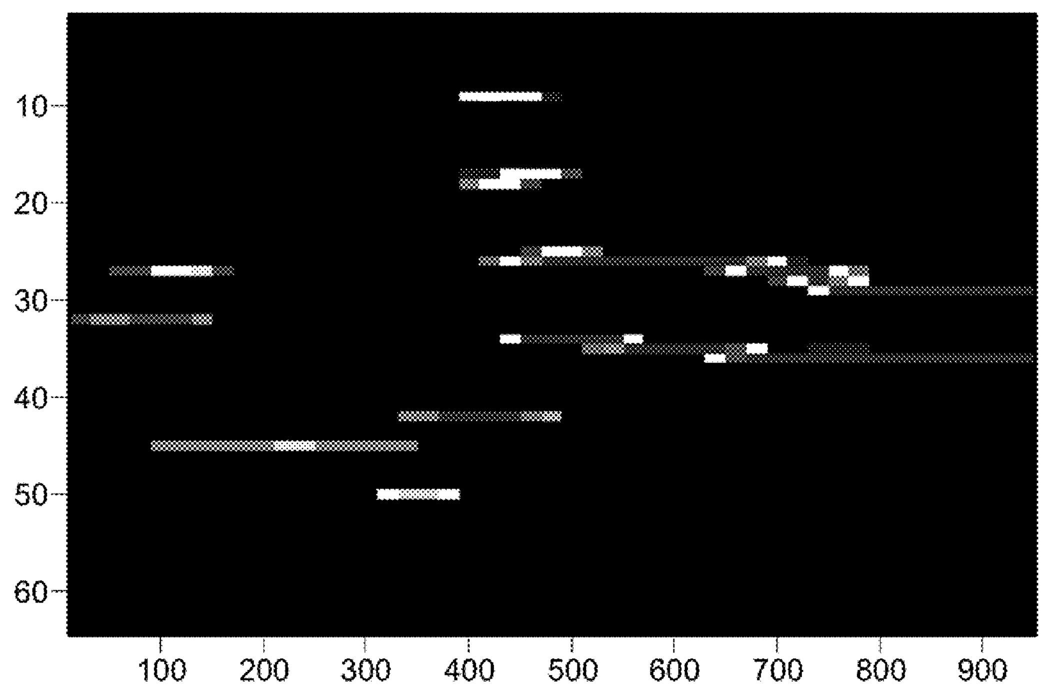
FIG. 9 illustrates a plot of HO2 features computed over overlapping windows of 200 frames of an Unload3P clip and stacked over time.
Figure 10:
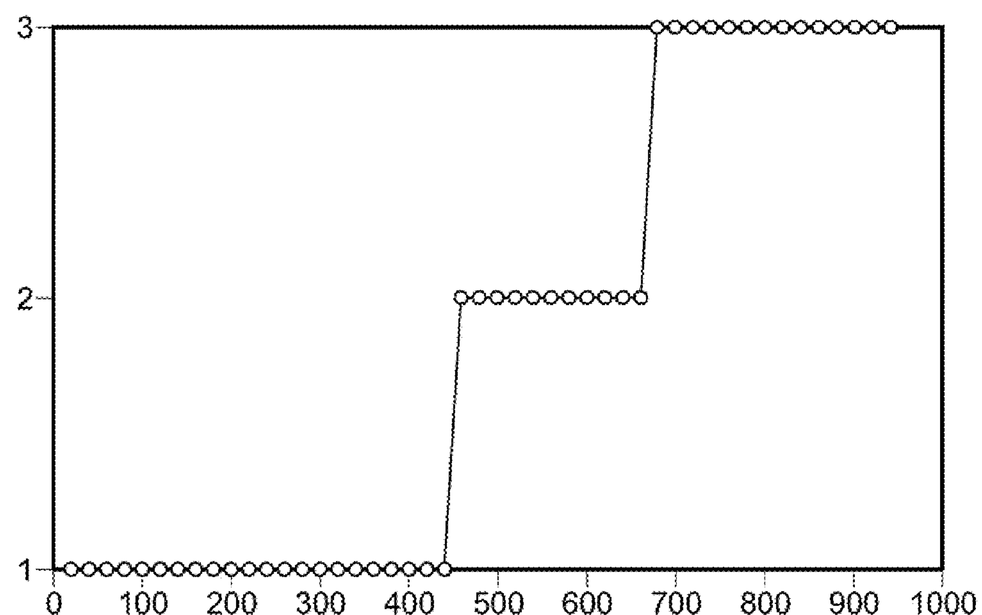
FIG. 10 shows the temporal segmentation results of the Unload3P clips segmented into three clusters using HO2 features.

The first example testing scenrio uses HO2 features to segment a video sequence into different stages. FIGS. 8, 9 and 10 illustrate a representative sequence, named Unload3P, and the corresponding results. In FIG. 8, there are three video frames representing each of the three action stages in the Unload 3P clip and their corresponding HO2 features. HO2 features are computed from the three frames using the car as the oriented reference entity. In this sequence, a first person walks out of building towards his/her car as shown in FIG. 8*a*. Then, two additional people exit a car and unload a box from the trunk as shown in FIG. 8*b*. Next, the two people carry the box and walk towards the building as the first person continues walking towards his car in FIG. 8*c*.

FIG. 9 shows a plot of HO2 features computed over overlapping windows of 200 frames of the Unload3P clip and stacked over time, where the X-axis is the frame number and the Y-axis shows the 64 dimensions of the HO2 feature vector. The values of the components of the HO2 features are shown using the "hot" color map, wherein the larger the value, the hotter the color. The three segments corresponding to the three action stages in the video sequence are shown as walking towards a car, unloading a box from trunk, and then walking away carrying a box.

The HO2 features are then clustered according to the $\chi^2$ distance. From the clusters, the video clip is segmented into three stages as shown in FIG. 10, which matches the ground truth. FIG. 10 shows the temporal segmentation results of the Unload3P clips segmented into three clusters using HO2 features.

Figure 11:
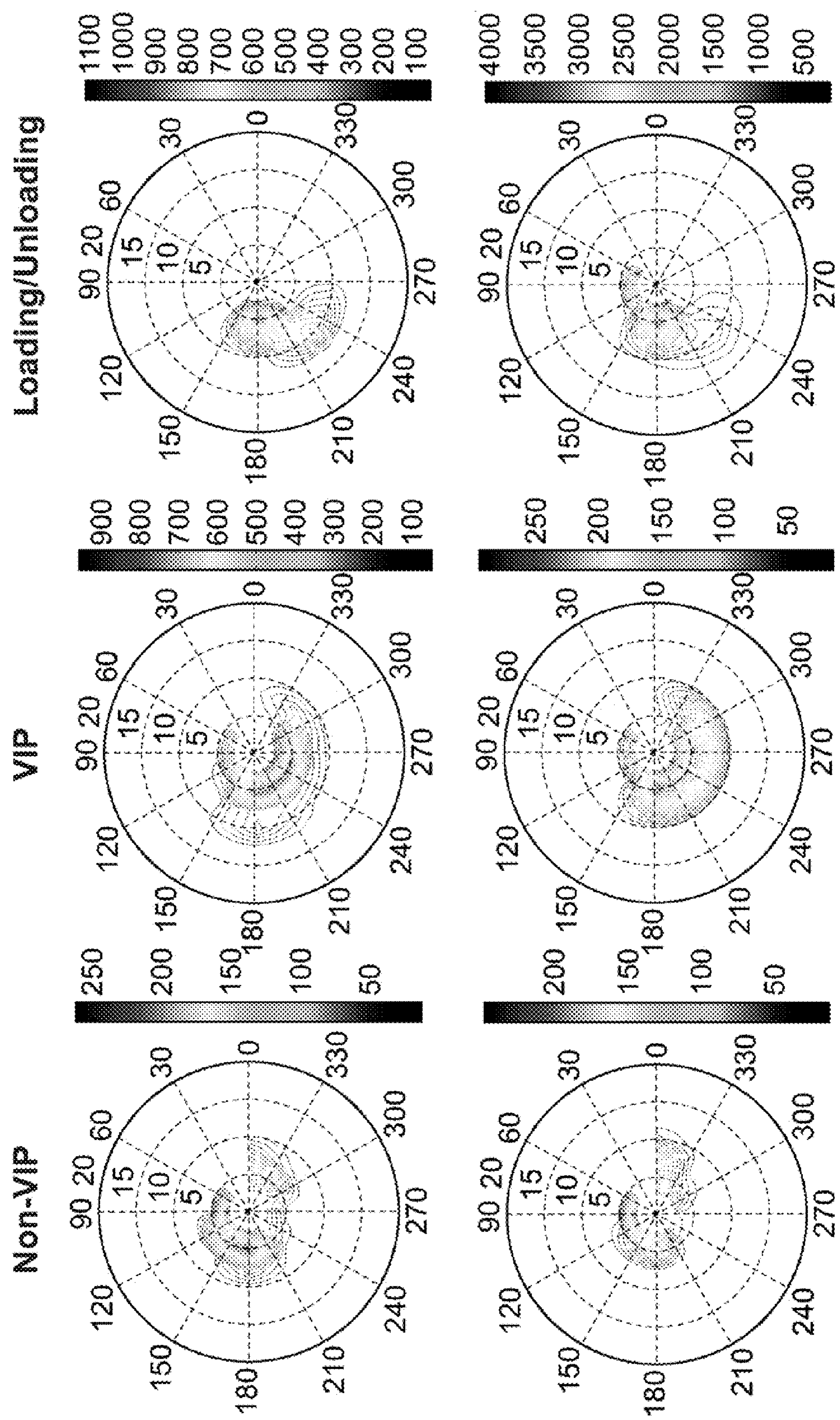
FIG. 11 illustrates HO2 features of three multi-agent complex events.

In the second example, the HO2 features are extracted from the whole sequences in the surveillance data set. Then, the HO2 features are used to recognize three events, Loading/Unloading, Mounting/Dismounting and VIP Arrival/Departure. FIG. 11 shows HO2 features of three multi-agent complex events: Non-VIP arrival/departure, VIP arrival/departure, and Loading/Unloading events. FIG. 11 shows that the same events have similar HO2 signatures and different events have different patterns. The HO2 features corresponding to the same event have similar patterns while HO2 features corresponding to different events are quite distinct.

Figure 12:
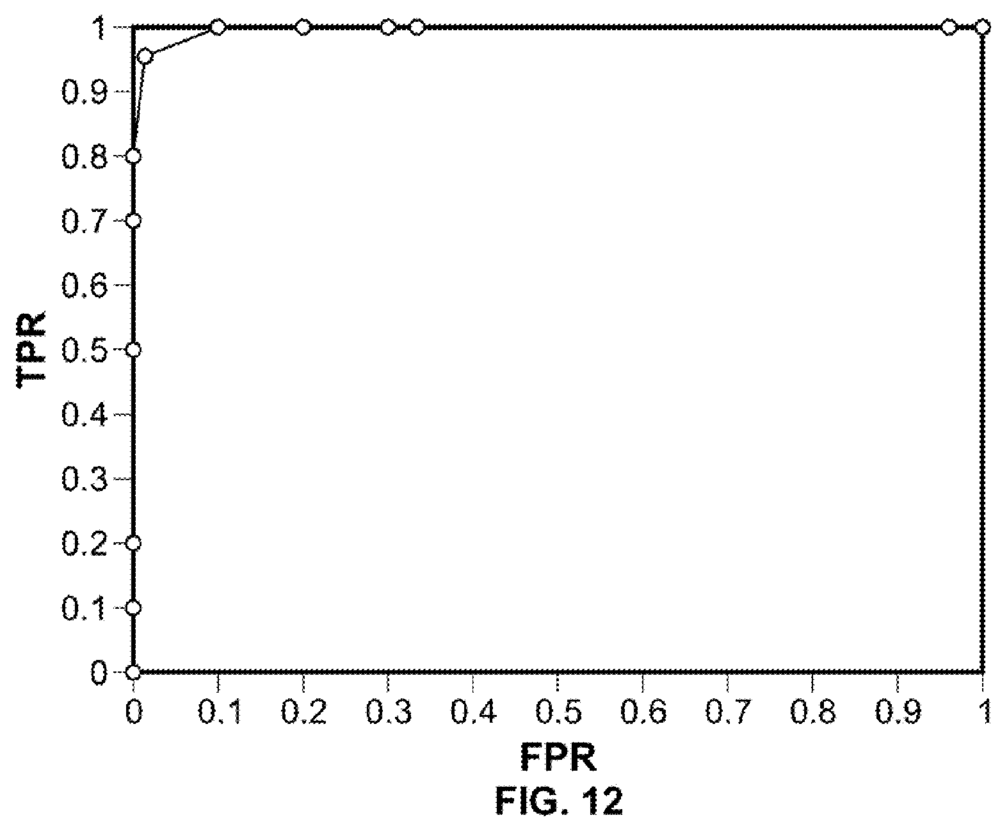
FIG. 12 illustrates an ROC curve of VIP event recognition.

In this example, a support vector machine (SVM) is used as the classifier. For VIP recognition, an HO2 with respect to people is computed. Therefore, one HO2 feature for each person or each people track is computed. Then, the HO2 features are classified into two classes: VIP and Non-VIP using the SVM. FIG. 12 shows an ROC curve of VIP event detection/recognition, where "TPR" is a true positive rate and "FPR" is a false positive rate. As shown in FIG. 12, an overall classification accuracy of 96.92% is achieved.

Figure 13:
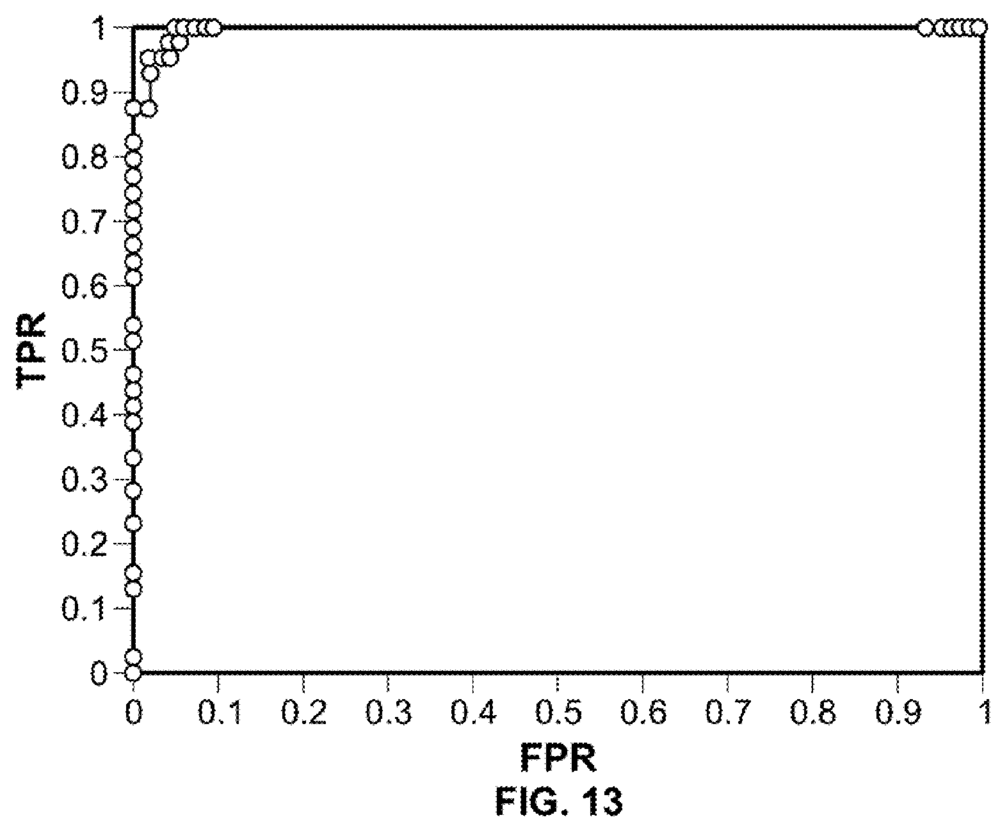
FIG. 13 illustrates an ROC curve of Mounting/Dismounting event recognition.
Figure 14:
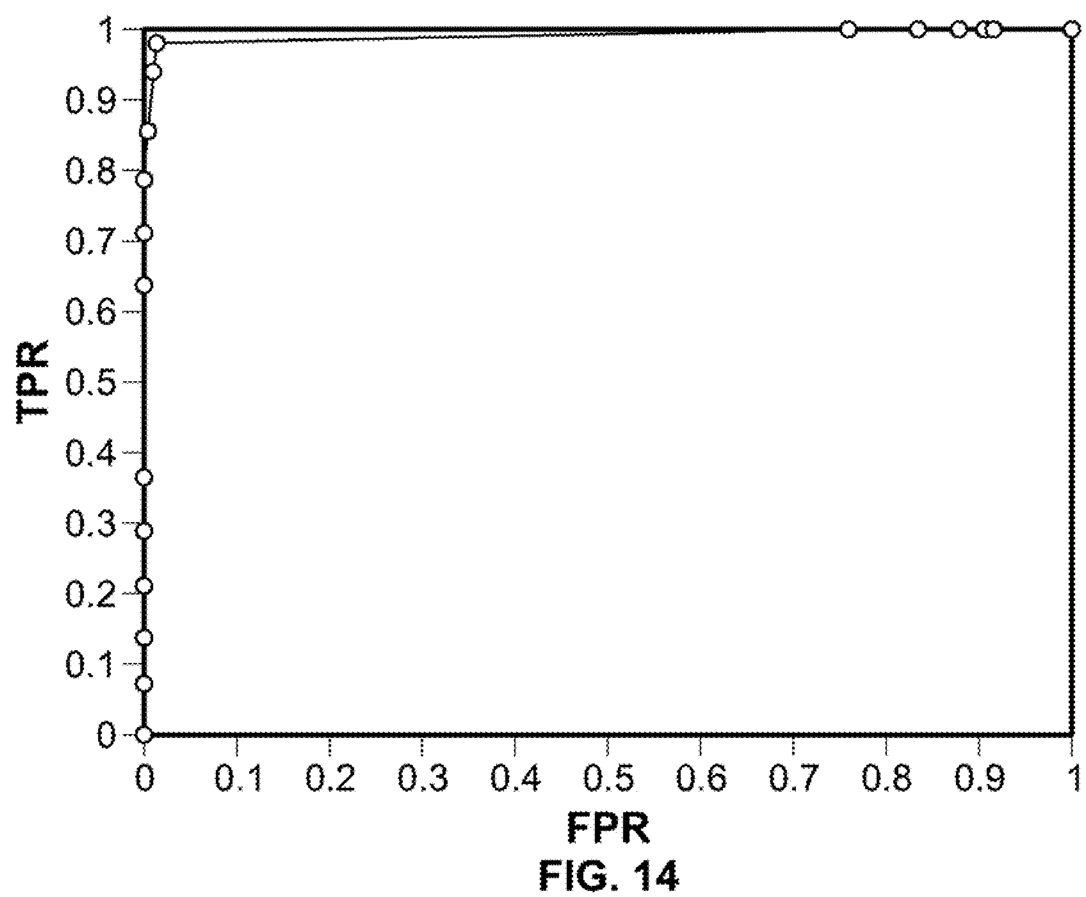
FIG. 14 illustrates an ROC curve of Loading/Unloading event recognition.

For Loading/Unloading and Mounting/Dismounting events, HO2 features with respect to vehicle are computed. Then, the HO2 features are classified using an SVM. The classification accuracy of Mounting/Dismounting vs. everything else is 96.15% and an ROC curve of the classification results is shown in FIG. 13. FIG. 13 illustrates the ROC curve of Mounting/Dismounting event recognition, where "TPR" is a true positive rate and "FPR" is a false positive rate. The classification accuracy of Loading/Unloading vs. everything else is 98.46% and an ROC curve is shown in FIG. 14. FIG. 14 shows the ROC curve of Loading/Unloading event recognition, where "TPR" is a true positive rate and "FPR" is a false positive rate.

Additionally, a VIP detection and recognition system has been developed. The inputs of the system are vehicle and people tracks. The outputs of the system are normalized VIP scores for each person. A screen shot of the VIP detection and recognition system is shown in FIG. 15, where the input video, people and vehicle tracks and VIP scores for each person are shown. FIG. 15*a* shows the input video with people marked in different colored bounding boxes. The upper line in FIG. 15*c* displays the response of a VIP (corresponding to the lower right box in FIG. 15*a* and middle line in FIG. 15*b*), and the other lines in FIG. 15*c* represent Non-VIPs (other boxes and lines in FIGS. 15*a* and 15*b*, respectively). The response from a VIP is much higher than the Non-VIP's. FIG. 15*b* shows vehicle and people tracks and FIG. 15*c* illustrates VIP scores vs. frame number for each person. The plot of FIG. 15*c* shows the significant differences in responses of a VIP vs. a Non-VIP.

The examples discussed above provide good results in applying HO2 features to a number of problem domains including temporal segmentation of an action sequence into stages, complex multi-agent event recognition and behavior and event matching for automated performance evaluation in military training.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for creating a histogram of oriented occurrences (HO2), the method being executed by at least one processor, comprising the steps of:

(a) detecting and tracking movement of a plurality of entities in at least two or more images over space and time;

(b) designating one of the plurality of entities as a reference entity;

(c) defining a local 2-dimensional ground plane coordinate system centered on and oriented with respect to the reference entity;

(d) partitioning the 2-dimensional ground plane into a plurality of non-overlapping bins, the bins forming a histogram, a bin tracking a number of occurrences of an entity class; and (e) determining one or more interactions over space and time between the tracked plurality of entities based on the partitioning of the ground plane with the reference entity as the frame of reference.

2. The method of claim 1, further comprising the step of associating an occurrence of at least one other entity of the plurality of entities located in the at least two or more images with one of the plurality of non-overlapping bins.

3. The method of claim 1, wherein each of the plurality of entities is one of an object and the location of an object in the at least two or more images.

4. The method of claim 1, wherein steps (a)-(d) are computed over one of a time instance and a time interval.

5. The method of claim 1, wherein the partitioned 2-dimensional ground plane moves when the reference entity moves.

6. The method of claim 1, wherein step (d) further comprises the step of employing a parts-based partition, wherein the parts-based partition measures a distance to the reference entity as the shortest distance to a point on the boundary of the reference entity and the bins are defined based on parts of the reference entity.

7. The method of claim 1, further comprising the step of loading a number of occurrences of entities of at least one entity class in at least one bin into a vector to define an HO2 feature.

8. The method of claim 7, further comprising the steps of:

geo-referencing the detected entities and their tracks to the 2-dimensional ground plane;

annotating each of the detected entities as one of a positive reference entity and a negative reference entity;

computing an HO2 feature for each annotated entity, the annotated entity being used as a reference entity;

selecting HO2 features with positive reference entities as positive training samples and selecting H02 features with negative reference entities as negative training samples;

classifying event samples with a classifier using the HO2 features using the positive and negative training samples;

extracting a second set of entities from a plurality of images;

computing HO2 features of each of the second set of, wherein, for each HO2 feature computation, a different one of the second set of entities is chosen as the reference entity; and classifying each of the second set of entities with the classifier to determine whether the event has occurred in the plurality of images.

9. The method of claim 8, wherein the classifier is a support vector machine (SVM).

10. The method of claim 9, wherein the SVM is built using the HO2 features of participants as positive samples and non-participants as negative samples.

11. The method of claim 7, further comprising the steps of:

computing HO2 features for an entity of interest from the plurality of entities over a sliding window of time to form a time sequence and clustering the time sequence using a clustering algorithm.

12. The method of claim 11, wherein the clustering algorithm comprises constructing a hierarchical cluster tree using $\chi^2$ distance and a using nearest neighbor strategy.

13. The method of claim 12, wherein the distance between two clusters is the smallest distance between objects in the two clusters.

14. The method of claim 13, wherein the clustering algorithm further comprises constructing clusters recursively from the root to leaves of the hierarchical cluster tree based on one of an inconsistence measure and the maximum number of clusters.

15. A computer-readable medium storing computer code for creating a histogram of oriented occurrences (HO2), the code being executed by at least one processor, wherein the computer code comprises code for:

(a) detecting and tracking movement of a plurality of entities in at least two or more images over space and time;

(b) designating one of the plurality of entities as a reference entity;

(c) defining a local 2-dimensional ground plane coordinate system centered on and oriented with respect to the reference entity;

(d) partitioning the 2-dimensional ground plane into a plurality of non-overlapping bins, the bins forming a histogram, a bin tracking a number of occurrences of an entity class;

(e) determining one or more interactions over space and time between the tracked plurality of entities based on the partitioning of the ground plane with the reference entity as the frame of reference.

16. The computer-readable medium of claim 15, further comprising code for associating an occurrence of at least one other entity of the plurality of entities located in the at least two or more images with one of the plurality of non-overlapping bins.

17. The computer-readable medium of claim 15, wherein (a)-(d) are computed over one of a time instance and over a time interval.

18. The computer-readable medium of claim 15, wherein (d) further comprises employing a parts-based partition, wherein the parts-based partition measures a distance to the reference entity as the shortest distance to a point on the boundary of the reference entity and the bins are defined based on parts of the reference entity.

19. The computer-readable medium of claim 15, further comprising code for loading a number of occurrences of entities of at least one entity class in at least one bin into a vector to define an HO2 feature.

20. The computer-readable medium of claim 19, further comprising code for:

geo-referencing the detected entities and their tracks to the 2-dimensional ground plane;

annotating each of the detected entities as one of a positive reference entity and a negative reference entity;

computing an HO2 feature for each annotated entity, the annotated entity being used as a reference entity;

selecting HO2 features with positive reference entities as positive training samples and selecting HO2 features with negative reference entities as negative training samples;

classifying event samples with a classifier using the HO2 features using the positive and negative training samples;

extracting a second set of entities from a plurality of images;

computing HO2 features of each of the second set of entities, wherein, for each HO2 feature computation, a different one of the second set of entities is chosen as the reference entity; and classifying each of the second set of entities with the classifier to determine whether the event has occurred in the plurality of images.

21. The computer-readable medium of claim 20, wherein the classifier is a support vector machine (SVM).

22. The computer-readable medium of claim 19, further comprising code for:

computing HO2 features for an entity of interest from the plurality of entities over a sliding window of time to form a time sequence; and clustering the time sequence using a clustering algorithm.

23. The computer-readable medium of claim 22, wherein the clustering algorithm comprises constructing a hierarchical cluster tree using $\chi^2$ distance and using a nearest neighbor strategy.

24. A system for creating a histogram of oriented occurrences (HO2), wherein at least at least two or more images are received from at least one image capturing device, comprising:

an image capture device for capturing digital images; and a processor, coupled to the image capture device, configured for:

detecting and tracking movement of a plurality of entities in the at least two or more images over space and time;

a ground plane module for:

designating one of the plurality of entities as a reference entity;

defining a local 2-dimensional ground plane coordinate system centered on and oriented with respect to the reference entity; and a partitioning module for:

partitioning the 2-dimensional ground plane into a plurality of non- overlapping bins, the bins forming a histogram, a bin tracking a number of occurrences of an entity class; and determining one or more interactions over space and time between the tracked plurality of entities based on the partitioning of the ground plane with the reference entity as the frame of reference.

25. The system of claim 24, further comprising a vector module for loading a number of occurrences of entities of at least one entity class in at least one bin into a vector to define an HO2 feature.

* * * * *